March 12, 1963 R. H. CARLSON 3,080,587
METHOD OF FORMING A CAP STUD
Filed March 23, 1959
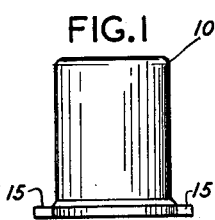
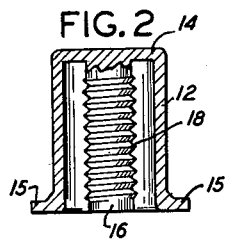
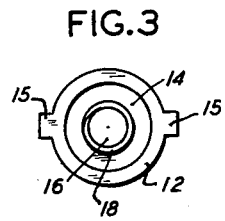
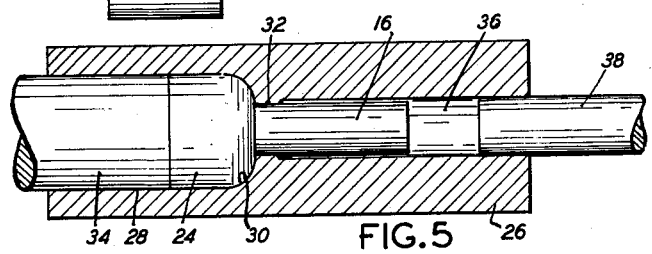
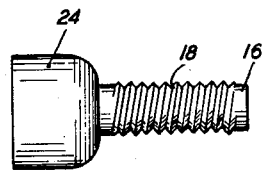
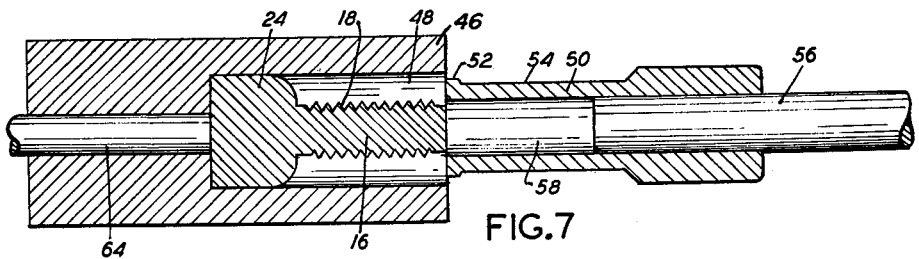
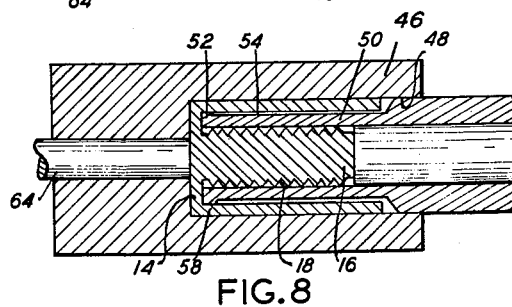
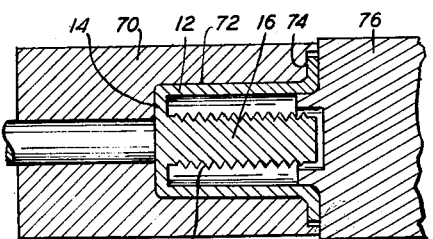
INVENTOR.
RAYMOND H. CARLSON
BY
BUCKHORN, CHEATHAM & BLORE
ATTORNEYS

United States Patent Office 3,080,587
Patented Mar. 12, 1963

3,080,587
METHOD OF FORMING A CAP STUD
Raymond H. Carlson, Rockford, Ill., assignor to Textron Industries, Inc., Rockford, Ill., a corporation of Delaware
Filed Mar. 23, 1959, Ser. No. 801,036
5 Claims. (Cl. 10—10)

The present invention relates to a cap stud and to a method of manufacturing the same.

The cap stud of the invention comprises a cup shaped cap having a threaded shank secured to the end wall thereof and positioned within the cap coaxially thereof. Heretofore such studs have been made by assembling separately manufactured cap and shank units. Such prior studs are inherently expensive to manufacture and have other disadvantages.

It is, therefore, an object of the present invention to provide a cap stud of the type described which is an integral unit made from a single piece of metal.

It is another object of the present invention to provide a method for manufacturing cap studs of the type described from a single piece of metal.

It is a further object of the invention to provide a cap stud having improved strength characteristics.

Still another object is to provide an economical method of manufacturing cap studs of the type described.

A further object is to provide a method for manufacturing an integral cap stud of the type described wherein the threads of the stud shank are rolled thereon.

Still other objects and advantages of the invention will become more apparent hereinafter.

In accordance with the illustrated embodiment of the invention a cylindrical metal workpiece is first extruded to provide a substantially unworked head part and an elongate shank of predetermined length. The shank is then rolled to form threads thereon and the workpiece is mounted in an aperture within a die with the periphery and end wall of the head part firmly engaged by the die and with the shank protruding toward the open end of the die. A tubular extrusion punch is then advanced over the shank and the end of the shank simultaneously engaged with a follower punch so as to force the shank and the annular portion thereabout endwardly of the head part. Due to the confinement of the head part within the die, the annular portion of the workpiece spaced outwardly of the tubular die will be forced to reverse extrude over the tubular die to form a tubular wall. When the shank has been pressed inwardly to the desired depth, the workpiece is removed from the holding die and the extruded wall formed and severed to leave a cap side wall of desired length.

For a more complete description of the invention, reference is made to the following specification and the accompanying drawings wherein:

FIG. 1 is a side elevation of a cap stud made in accordance with the method of the invention;

FIG. 2 is a sectional view of the stud;

FIG. 3 is an end view of the cap stud;

FIG. 4 is an elevation of a workpiece from which the cap stud is manufactured in accordance with the method of the invention;

FIG. 5 is a view showing a workpiece after the first forming stage and the die in which such formation occurs;

FIG. 6 is a side elevation of the workpiece after the next forming step;

FIG. 7 is a view of the workpiece positioned in another die ready for the next succeeding work step;

FIG. 8 is a view illustrating the final extrusion step in the process of the invention; and FIG. 9 is a view illustrating a finishing step in the manufacture of cap studs in accordance with the invention.

Referring first to FIGS. 1, 2 and 3 of the drawings, cap studs of the type with which the present invention is concerned are indicated generally at 10 and comprise a cup shaped cap including a cylindrical side wall portion 12 and an end wall 14. Coaxial with the side wall portion 12 is a shank 16 provided with threads 18 and which shank is in cap studs formed by the method of the present invention integral with the end wall 14. The side wall portion 12 may be formed adjacent the open end of the cap with a pair of oppositely projecting prongs or ears 15.

In accordance with the method of the invention, there is first provided a cylindrical workpiece 20, such as is shown in FIG. 4. This may be provided by any conventional means such as severing from wire or rod stock. The workpiece 20 preferably has a diameter substantially equal to the diameter of the side wall portion 12 of the cap 10 and a volume slightly greater than the material volume of the finished part. Referring to FIG. 5, the workpiece 20 is first subjected to an extrusion process to extrude therefrom an elongate shank portion 16 leaving a substantially unworked head part 24. This extrusion is preferably carried out in a die 26, such as is shown in FIG. 5, provided with a cavity having a straight side wall portion 28 for receiving the workpiece 20 and which cavity converges at its inner end to define a concave material contacting surface 30 leading to an extrusion orifice 32. Extrusion pressure is applied to the workpiece 20 by means of a punch 34 so as to extrude the shank 16 through the orifice 32 and into a receiving cavity 36 which preferably is of a diameter slightly greater than that of the shank 16 as indicated in exaggerated fashion in FIG. 5. A conventional knock-out punch 38 may be provided to remove the workpiece from the die 26 after the extrusion of the shank 16.

After removal from the die 26, the shank 16 is subjected to a thread forming process. Preferably, the threads 18 are formed on the shank 16 by a rolling process since, as it is well known to those skilled in the art, rolling of the threads effects a work hardening of the metal and greatly strengthens the same.

After the threads 18 are formed on the shank 16, the workpiece is positioned in a holding and extrusion die 46, such as shown in FIG. 7, having a cylindrical cavity 48 of a diameter snugly to receive the unworked head part 24 of the workpiece. A tubular punch 50 is then advanced over the shank 16 of the workpiece. The punch 50 is provided with an inner diameter just sufficient to clear the crest of the shank threads 18 and with an outer diameter which is less than that of the head part by a predetermined amount at its end portion 52. The punch 50 is slightly relieved rearward'y of its forward end 52 as indicated at 54 and which relief is exaggerated in the drawings. Advanced simultaneously with the punch 50 is a second or follower punch 56 which is positioned within the cavity 58 of the punch 50. The punch 56 is positioned to engage the end of the shank 16 at the moment the punch 50 engages the head part 24. The punches 50, 56 are then advanced simultaneously to force the outer punch 50 and the shank 16 a predetermined distance inwardly of the head part 24. This causes the outer annular portion of the head part 24 to back extrude over the punch 50 to form a tubular extrusion or wall indicated at 58 in FIG. 8. The relief 54 on the punch 50 minimizes the frictional resistance as the extrusion wall 58 comes back over the punch. The advancement of the punch 50 is ceased so as to leave the end wall 14 of desired thickness. After this step, the punch 50 is withdrawn while the punch 56 is held stationary and finally, the punch 56 is withdrawn and the workpiece knocked from the die 46 by a knock-out punch 64.

The workpiece is next positioned in a second holding die 70 having a cylindrical cavity 72 for receiving the body of the workpiece, the die having an annular recess 74 in its face around the cavity 72. The workpiece is then struck with a flaring tool 76 to bend the endmost part of the extruded wall 58 into the recess 74. Thereafter the bent over flashing may be trimmed to form the prongs or ears 15 and finally the outer surfaces of the body may be machined or polished as desired.

The integral cap stud 10 is obviously inherently strong. Moreover, the integral cap studs 10 are considerably lighter in weight than studs of comparable strength and size manufactured by other methods. This reduction in weight obviously is of great advantage for many applications, such as, for example, in aircraft. A further advantage resides in the economy of manufacture. A most important advantage of the process herein is that it permits the rolling of threads upon the shank 16 and which is necessary to give the shank the desired strength characteristics.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. The method of making a cap stud including a cup shaped cap and a threaded shank integral with the end wall of said cap, said method comprising the steps of providing a workpiece including a cylindrical head part and a cylindrical shank portion of reduced diameter, forming threads on said shank, applying pressure in the axial direction to the end of said shank portion and to an annular area of said head part spaced inwardly of the periphery thereof and immediately adjacent said shank portion while restraining said head part from lateral expansion and from movement bodily in direction of said pressure to cause the material of said head part to extrude in the area surrounding said annular area in the direction opposite the direction of said pressure, confining said shank portion and the extruded annular portion against lateral expansion, and ceasing the application of said pressure at a predetermined point to leave an end wall of predetermined thickness.

2. The method of making a cap stud including a cup shaped cap and a threaded shank integral with the end wall of said cap, said method comprising the steps of providing a cylindrical workpiece, extruding a predetermined portion of said workpiece to provide a cylindrical shank portion of reduced diameter and a coaxial head part, forming threads on said shank, applying pressure in the axial direction to the end of said shank portion and to an annular area of said head part spaced inwardly of the periphery thereof and immediately adjacent said shank portion while restraining said head part from lateral expansion and from movement bodily in direction of said pressure to cause the material of said head part to extrude in the area surrounding said annular area in the direction opposite the direction of said pressure, confining said shank portion and the extruded annular portion against lateral expansion, and ceasing the application of said pressure at a predetermined point to leave an end wall of predetermined thickness.

3. The method of making a cap stud including a cup shaped cap and a threaded shank integral with the end wall of said cap, said method comprising the steps of providing a cylindrical workpiece, extruding a predetermined portion of said workpiece to provide a cylindrical shank portion of reduced diameter and a coaxial head part, rolling threads on said shank, applying pressure in the axial direction to said shank portion and to an annular area of said head part spaced inwardly of the periphery thereof and immediately adjacent said shank portion while restraining said head part from lateral expansion and from movement bodily in direction of said pressure to cause the material of said head part to extrude in the area surrounding said annular area in the direction opposite the direction of said pressure, confining said shank portion and the extruded annular portion against lateral expansion, and ceasing the application of said pressure at a predetermined point to leave an end wall of predetermined thickness.

4. The method of making a cap stud including a cup shaped cap and a threaded shank integral with the end of said cap, said method comprising the steps of providing a cylindrical workpiece of a diameter substantially equal to the outer diameter of said cap, extruding a predetermined portion of said workpiece to provide a shank portion and an unworked head part, forming threads on said shank, thereafter positioning the workpiece in a die having a cylindrical cavity of a diameter snugly to receive said head part with said threaded shank facing outwardly, said cavity having a length greater than that of said shank, advancing over said shank a tubular punch of an outer diameter less than said head part and an inner diameter just sufficiently great to clear said threaded shank, and forcing said punch a predetermined distance into said head part to cause the outer annular portion of said head part to extrude over said punch.

5. The method of making a cap stud including a cup shaped cap and a threaded shank integral with the end of said cap, said method comprising the steps of providing a cylindrical workpiece of a diameter substantially equal to the outer diameter of said cap, extruding a predetermined portion of said workpiece to provide a shank portion and an unworked head part, forming threads on said shank by thread rolling the same, thereafter positioning the workpiece in a die having a cylindrical cavity of a diameter snugly to receive said head part with said threaded shank facing outwardly, said cavity having a length greater than that of said shank, advancing over said shank a tubular punch of an outer diameter less than said head part and an inner diameter just sufficiently great to clear said theaded shank, and forcing said punch a predetermined distance into said head part while simultaneously applying endwise pressure to said shank to cause the outer annular portion of said head part to extrude over said punch.

References Cited in the file of this patent

UNITED STATES PATENTS

| | | |
|---|---|---|
| 1,035,020 | Lanz | Aug. 6, 1912 |
| 2,161,419 | Kepperman | June 6, 1939 |
| 2,199,809 | Pigott | May 7, 1940 |
| 2,322,811 | Ball | June 29, 1943 |
| 2,727,256 | Moore | Dec. 20, 1955 |
| 2,813,279 | Friedman | Nov. 19, 1957 |
| 2,953,247 | Walter | Sept. 20, 1960 |